Jan. 28, 1964 A. G. SAMUSENKO 3,119,935

NETWORK EMPLOYING RESET MEANS FOR BISTABLE OPERATING GATING CIRCUITS

Filed Nov. 27, 1959 4 Sheets-Sheet 1

INVENTOR.

ANATOL G. SAMUSENKO

BY John V. Regan

ATTORNEY

Jan. 28, 1964 A. G. SAMUSENKO 3,119,935

NETWORK EMPLOYING RESET MEANS FOR BISTABLE OPERATING GATING CIRCUITS

Filed Nov. 27, 1959 4 Sheets-Sheet 2

INVENTOR.
ANATOL G. SAMUSENKO
BY John V. Regan
ATTORNEY

INVENTOR.
ANATOL G. SAMUSENKO
BY John V. Regan
ATTORNEY

INVENTOR.
ANATOL G. SAMUSENKO
BY John V. Regan
ATTORNEY

United States Patent Office 3,119,935

Patented Jan. 28, 1964

3,119,935

NETWORK EMPLOYING RESET MEANS FOR BISTABLE OPERATING GATING CIRCUITS

Anatol G. Samusenko, Lakewood, N.J., assignor to Radio Corporation of America, a corporation of Delaware Filed Nov. 27, 1959, Ser. No. 855,593
6 Claims. (Cl. 307—88.5)

This invention relates to logical networks, and particularly to logical networks of two-terminal, negative resistance elements.

A logical network is an arrangement of elements which performs a prescribed function on a set of input signals. For example, in data processing applications the network may include a number of simple logical gating circuits, such as "and," "or," "nor," etc., interconnected with each other to perform a complex logical operation. The operation may be expressed in a special notation such as Boolean algebra where each term of an expression is implemented by one or more of the gating circuits. Logical networks also find use in switching and routing applications.

Two-terminal, negative resistance elements can provide simple and high-speed gating circuits. By operating the elements in a bistable mode, logical "gain" can be provided when the elements switch from an initial to the other of the stable states. By logical gain is means that one gating circuit can control a plurality of connected gating circuits. The elements must be reset to their initial condition prior to receiving each new set of input signals. One problem with these elements is that they do not provide "gain" in switching in the reverse direction, from the other to the initial sate. One means proposed for resetting the circuits is to use a periodic power supply having "on" and "off" conditions. During the "on" condition, the signals are transmitted by the network. During the "off" condition of the power supply, the network elements are reset. It is rather difficult to provide a suitable power supply of the periodic type because in practice, its waveshape must be carefully controlled to achieve efficient and reliable operation of the elements. A well regulated waveshape is required because the elements operate as threshold devices and variations in the power supply waveshape can cause spurious switching of the elements. Also certain of the negative resistance devices are of the current responsive type to further complicate the power supply problem.

It is an object of the present invention to provide improved means for and methods of arranging and operating logical networks of two-terminal devices.

Another object of the present invention is to provide improved logical networks using two-terminal devices in which the power supply problems are greatly simplified.

Still another object of the present invention is to provide improved arrangements of logical networks using negative resistance elements.

According to the invention, a logical network includes first and second groups of gating circuits interconnected with each other to perform a desired logical function. The two groups are interlaced so that the outputs of a first group are applied to the inputs of a succeeding second group, and the outputs of a second group are applied to the inputs of a succeeding first group. All the circuits are connected to a D.C. (direct current) supply. The D.C. supply and the circuit parameters are arranged so that each circuit operates in the bistable mode. A first reset means is coupled to all circuits of the first group, and a second reset means is coupled to all the units of the second group.

In operation, the first reset means is operated to change all the circuits of the first group to their initial states. These first group circuits then are ready to receive and operate on input signals applied from the second group circuits. The input signals may be applied during or after the first reset operation. In certain instances, a first group circuit may receive additional input signals from sources external to the logical network, or from another first group circuit. The first group circuits then perform desired logical operations on the received input signals. During, or after, the application of the input signals to the first group circuits, the second reset means is operated to change all the second group circuits to their initial states. The second group circuits then are ready to receive and operate on signals from the first group circuits, from external sources or between various second group circuits. The operation is continued in this fashion with the first and second reset means alternately operating to cause the flow of information signals through the network.

Figure 1:
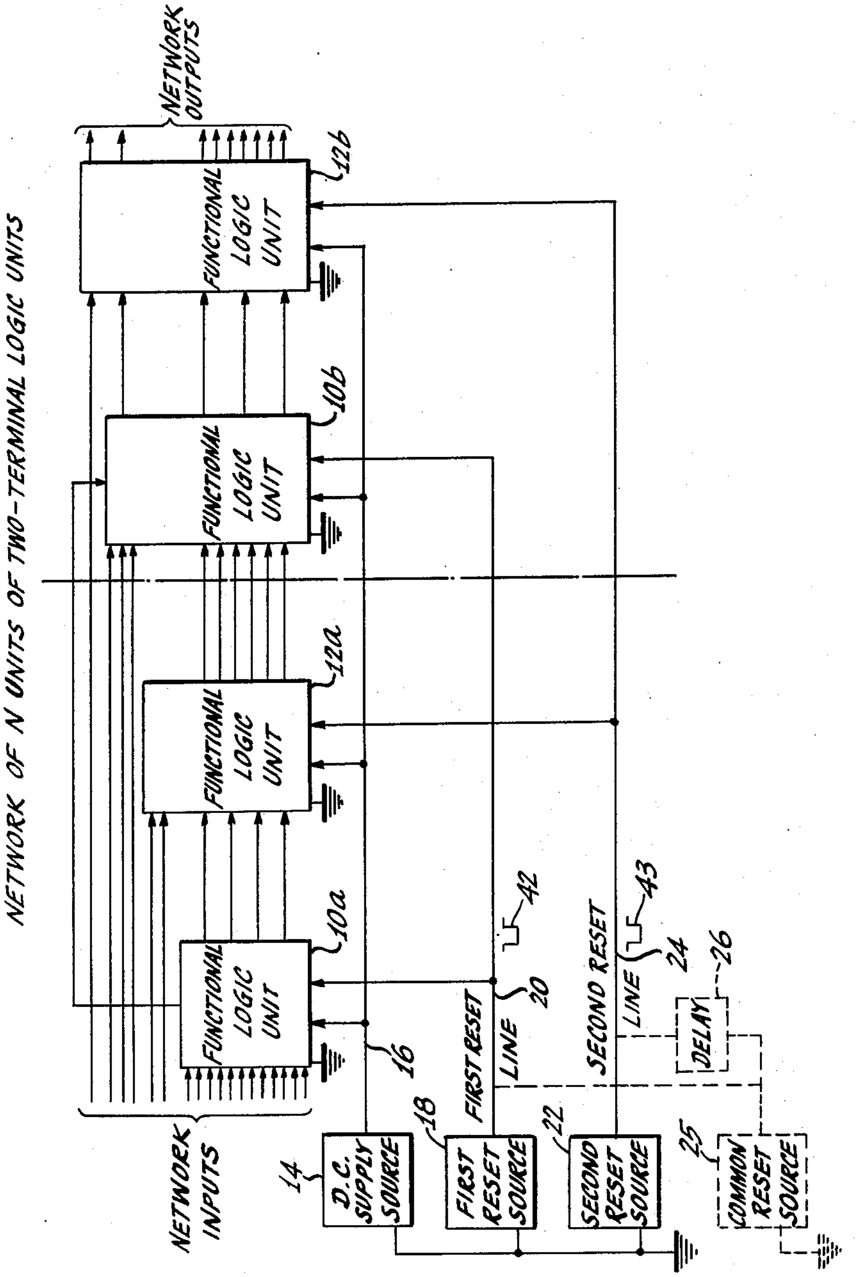
FIG. 1 is a block diagram of a logical network according to the invention.

In the network of FIG. 1, a first group 10 of logic units are interlaced with a second group 12 of logic units. For ease of drawing, only a pair of units 10*a*, 10*b* of the first group 10, and a pair of units 12*a*, 12*b* of the second group 12 are shown. The vertical dashed line is used to indicate that additional interlaced units 10 and 12 may be connected in the network. Also, for convenience of drawing the groups of logic units are shown in a straight line, however, much more complicated arrangements of the logic units are possible. For example, the units may be arranged in tiers with each tier having one or more units 10 or 12. Further, the physical arrangements shown in FIG. 1 is merely exemplary. Thus, in certain equipments it may be desirable to have all the units 10 at one location and all the units 12 at another location. However, in the latter case the units 10 and 12 would be electrically connected in ordered sequence, with successive first groups being interlaced by second groups. A common D.C. supply source 14 is connected by a supply line 16 to all the units 10. A first reset means including a pulse source 18 is connected by a first reset line 20 to the first group of circuits 10*a*, 10*b*. A second reset means including a pulse source 22 is connected by a supply line 24 to the second group of circuits 12*a*, 12*b*. If desired, a common reset source 25, shown dotted, may be used in place of the first and second reset means 14 and 18. A delay circuit 26 then is used to connect the common reset source 25 to the second group 12 of the units. The delay circuit 26 is arranged to delay the second group reset pulse by a fixed amount from the first group reset pulse. A common return path is provided between each of the units 10, 12 and each of the various sources, as indicated by the conventional ground symbol.

Separate logical signals are received at the input side, the left side as viewed in the drawing, of the network. These input signals may be of the two-valved binary type and are supplied by any suitable source, for example, other logical networks, other input devices such as tapes, drums, flip-flops, and so on. The input signals are suitably timed by any appropriate means such as a timing signal generator, delay circuits, and so on, such that they are applied in proper time sequence to the various logical circuits. For example, the network input signals applied to the second group unit 12*a* may be delayed or stored until the first group unit 10*a* has processed its input signals. The network input signals then propagate through the network with each unit 10 and 12 operating in desired fashion on the received signals. Also certain of the units 10 may be directly connected by one or more lines which bypass one or more intermediate units 12, as shown by the direct connection between the units 10*a* and 10*b*. Also the units 12 may have one or more direct connections in similar manner to the units 12*a*, 12*b*. The network output signals may be provided by the unit 12*b*. In certain instances, network output signals may be derived from others of the network units 10 and 12.

Figures 2, 3:
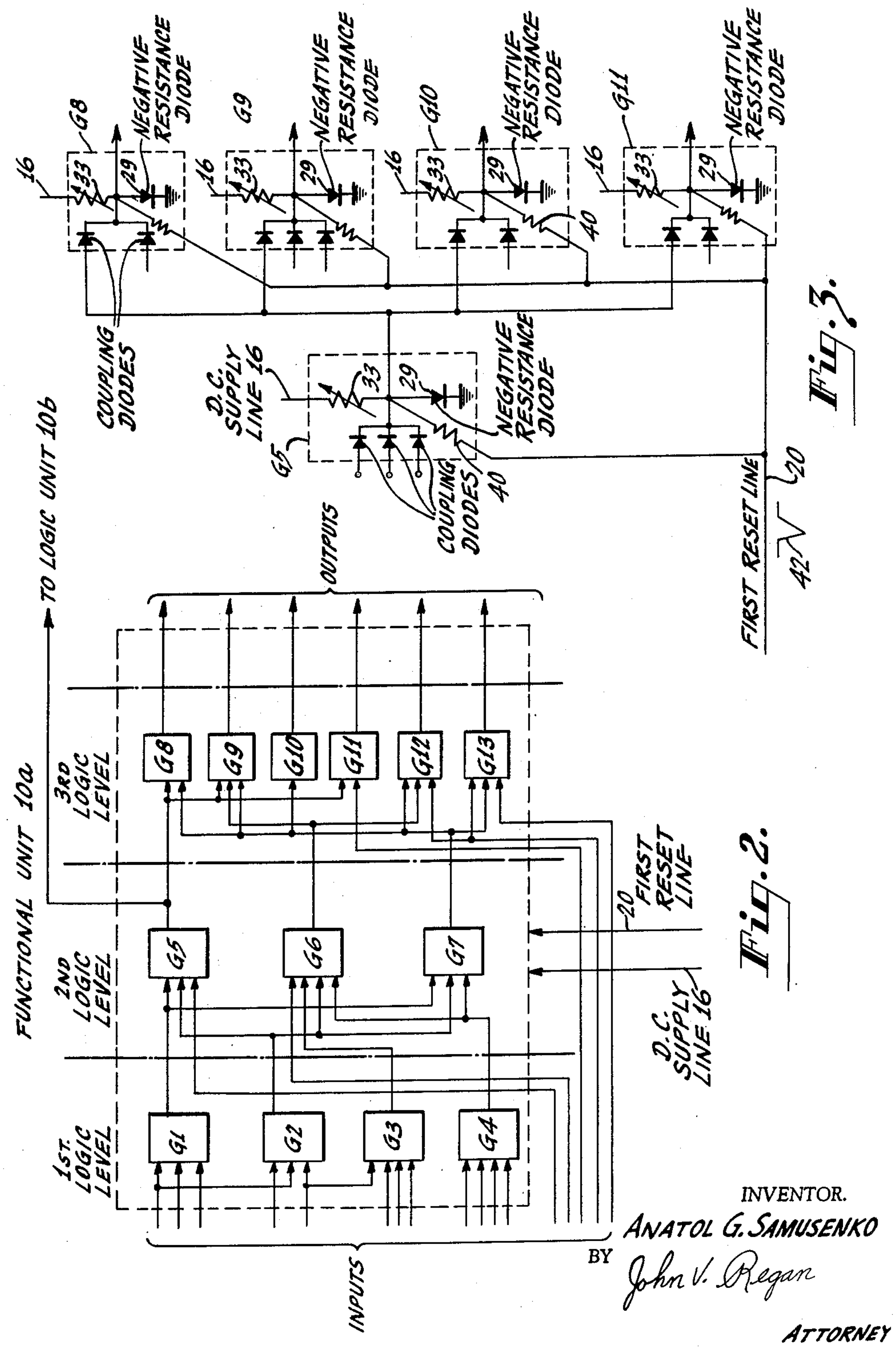
FIG. 2 is a block diagram of one of the functional units of the network of FIG. 1.
FIG. 3 is a schematic diagram of a portion of the functional unit of FIG. 2 and useful in explaining the invention.

A more detailed diagram of a functional unit for example the unit 10*a* of FIG. 1, is shown in FIG. 2. The unit 10*a* illustratively has three logic levels, the first including the gating circuits G1–G4, the second including the gating circuits G5–G6, and the third including the gating circuits G8–G13. The D.C. supply line 16 is connected to all the gating circuits G1–G13 as is the first reset line 20. The unit 10*a* input signals are processed in the stages of the first logic level producing output signals according to certain logical expressions, then the first level output signals are processed with or without additional signals in the stages of the second level according to other logical expressions, and so on. Note that any one gating circuit may receive signals from a number of gating circuits of a lower order level and transmit signals to a number of gating circuits of a higher order level. For example, second level gating circuit G–5 transmits signals to third level gating circuits G8–G11 and receives signals from first level gating circuits G1–G2. Gating circuit G–5 also directly receives a signal from one of the network inputs.

FIG. 3 is a more detailed diagram of the combination of gating circuits G5 and G8–G11. Preferably, each gating circuit includes a two-terminal negative resistance element. A suitable element is a negative resistance diode 29. By "negative resistance diode" is meant a junction type diode which is heavily doped to provide a negative resistance over a range of forward bias voltage. These negative resistance diodes, sometimes referred to as "tunnel diodes," are described in the literature, for example in separate papers by Sommers et al., and Lesk et al., in the 1959 Wescon Convention Record, Part III, Aug. 18–21, 1959.

Figures 4, 5:
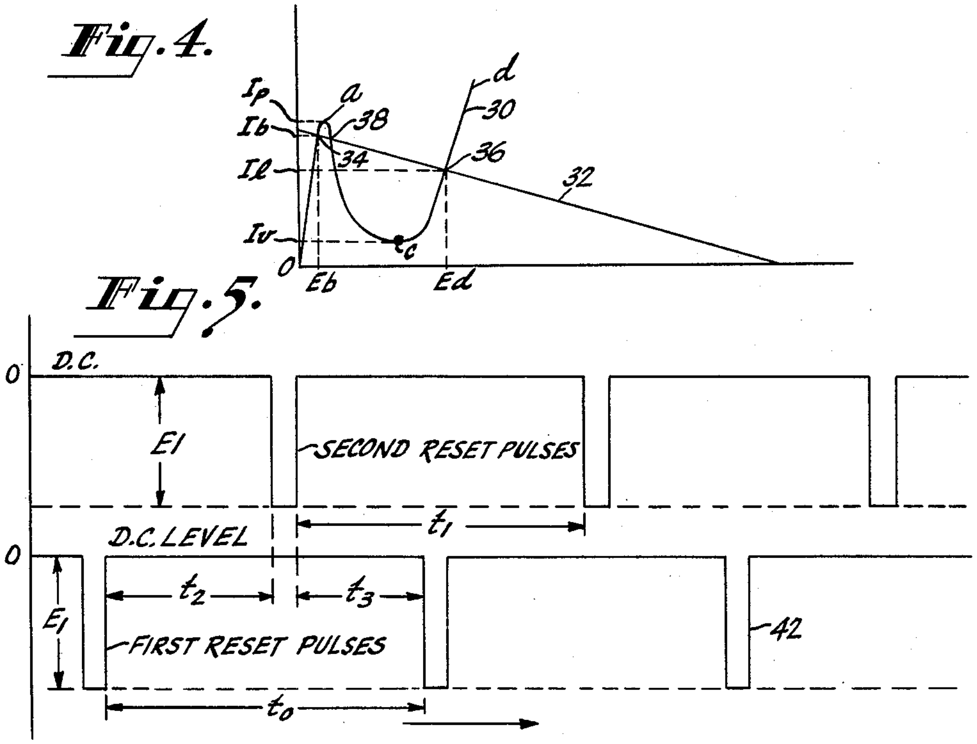
FIG. 4 is a curve showing the current-vs.-voltage characteristics of negative resistance diodes.
FIG. 5 is a timing diagram useful in explaining the operation of the logical network of FIG. 1.

The curve 30 of FIG. 4 shows the static current vs. voltage characteristics of a negative resistance diode 29. The curve portions *oa* and *cd* are regions of positive resistance, and the dotted curve portion *ac* is a region of negative resistance. The two regions of positive resistance are stable operating regions and, with a load line such as shown at 32, the negative resistance region which is an unstable operating region. Each of the gating circuits is operated as a bistable circuit and each is arranged to have a bistable load line 32 by using a suitable value of load resistance 33 (FIG. 3) and a suitable D.C. supply source voltage. The load line 32 intersects curve 30 at points 34 and 36 in the two positive resistance regions, and at point 38 in the negative resistance region. The point 34 corresponds to the "low" voltage state of the diode circuit and the point 36 corresponds to the "high" voltage state of the diode. In the "low" state a relatively large current $Ib$ flows through the diode and a relatively low voltage $Eb$ appears across the diode. A current in excess of a peak current $Ip$, corresponding to the point *a*, must be applied to switch the diode from the positive resistance region *oa* to the positive resistance region *cd*. The diode switching action occurs rapidly and, in certain practical circuits, in the order of from less than 1 to 10 millimicroseconds. With the diode in the "low" state and biased as shown, a net current in excess of $(Ip–Ib)$ must be applied to the diode to switch it to the "high" state. Any combination of input signals supplying the required net input current can switch the diode state. Thus the circuits of FIG. 3 operate as "threshold" logic gates with the threshold switching current defined as being equal to $(Ip–Ib)$.

A logical "or" gate is provided by arranging each input signal to provide a current slightly in excess of the threshold current $(Ip–Ib)$ so that any one or more of the input signals operate to change the circuit from the "low" to the "high" state.

A logical "and' gate is provided by arranging the circuit so that when all the input signals are present at the same time a current slightly in excess of the threshold current is applied to the diode, and when less than all the input signals are present a net current less than the threshold current is applied to the diode. Preferably, the circuit parameters are made such that a larger threshold current is required for "and" gate operation than for "or" gate operation. The gate circuit threshold is readily adjusted, as for example, by using diodes having different peak currents $Ip$ for the "and" "or" gate circuits, and/or by using different values of load resistors for the "and" and "or' gate circuits, and/or by using adjustable load resistors 33 as indicated in FIG. 3, and so on. Also other logical operations can be carried out in which one or more of the input signals are of negative polarity and the remainder are of positive polarity. In the latter case, the gating circuit switches to the high state only when the net positive signal exceeds the threshold value set for that gating circuit.

Note that in switching from the "low" to the 'high" state the relatively low value of switching current $(Ip–Ib)$ at relatively low voltage switches the diode to its "high" state-relatively large current and voltage. Thus, the gating circuit provides gain in switching from the "low" to the "high" state. In the "high" state a relatively large voltage $Ed$ appears across the diode. The voltage $Ed$ is sufficient magnitude to cause a resulting current flow through the coupling diodes. Thus as indicated in FIG. 3, a gate G5 can drive four other logical circuits G8–G11. When the gate G5 is in the "low" state substantially no voltage difference appears across a coupling diode and hence substantially no current flows in the coupling circuits.

The coupling diodes of FIG. 3 are positive resistance type diodes, such as T96 type. The coupling diodes provide a unidirectional, non-linear impedance to permit information signals to flow in one direction i.e. from a gate input line to the diode 29 anode, and prevent information signals from flowing in the opposite direction i.e. from the diode 29 anode to the gate input. The coupling diodes are connected to provide a relatively low impedance to signal flow from the gate circuit G5 to the gate circuits G8–G11 and to provide a relatively high impedance from the gate circuits G8–G11 to the gate circuit G5. For example, assume that the gate circuit G8 is in the "high" state the gate G5 is in the "low" state. A relatively large voltage E$d$ then appears across the negative resistance diode 29 of the gate circuit G8. The voltage E$d$ is in a direction to cause an additional current flow through the negative resistance diode of the gate circuit G5. However, the coupling diode between these gate circuits prevents any appreciable current flow from the gate G5. In the absence of the coupling diodes, therefore, the gate circuit G5 may be spuriously changed from the "low" to the "high" state by undesired signals from one or more of its connected gate circuits. The coupling diodes serve as one means of making the information flow through the logical network unilateral. However, the present invention is not restricted to networks which use coupling diodes to provide unilateral signal flow, and any other suitable means to insure unilateral flow of signals through the network may be employed.

The first reset line 20 is connected to the anodes of all the negative resistance diodes by means of separate resistors 40. The resistors 40 serve as decoupling elements to prevent any appreciable current flow from the gating circuits to the first reset source 18. Negative polarity reset pulses 42 are applied by the first reset source to the first reset line 20. These reset pulses are of sufficient amplitude to change all the gating circuits from the "high" to the "low" states.

By arranging the logical network as described, a number of important features result. One feature is that the reset pulse need supply a current only in excess of the value (I$p$–I$v$) to change the gate circuits from the "high" to the "low" states. Thus, unlike the input signal currents, the reset currents can be as large as desired. A second feature is that the waveshape of the reset current is not critical and need not be controlled. This feature provides important practical advantages over prior networks using two-terminal negative resistance devices. A third feature is that the gating circuit does not provide "gain" during the reset operation. This lack of gain is inherent in the bistable device whether the circuits are arranged according to the prior art or according to the present invention. The reason why the devices do not produce gain during the reset operation is readily seen with reference to FIG. 4. Thus, a greater than net current (I$p$–I$v$) must be supplied to the diode to cause it to change from the "high" to the "low" state. This lack of gain in changing from the "high" to the "low" states presents a serious problem when the two-terminal, negative resistance gating circuits are used according to the teachings of the prior art. For example, prior art circuits of the bistable type are provided with a set and a reset input in which equal amplitude signals applied to the respective inputs change the gating circuits to the corresponding states. Thus, if the prior art arrangements were desired to be used with the two-terminal negative resistance gating circuits as shown in FIG. 3, some additional means, such as amplifiers, would be required to compensate for the lack of "gain" in switching from the "high" to the "low" state.

The fourth feature is that the reset signals of the present invention are applied unconditionally. This means that only the D.C. supply need be carefully regulated. The reset signals need be applied only at specified time intervals. In practice, it is relatively simple to arrange a well-regulated D.C. supply and to arrange a repetitive pulse source. Effectively, the power supply functions are separated with each function being carried out by the most efficient circuits.

The timing diagram of a FIG. 5 shows the sequence of application of the reset pulses to the logical network of FIG. 1. A steady D.C. signal of amplitude E1 is applied by the D.C. source 14 to each of the units 10 and 12 of the logical network. Negative reset pulses 42 of the bottom line of FIG. 5 are applied to the first reset line 20 at regular time intervals $t_0$. Negative reset pulses 43 of the upper line of FIG. 5 are applied regularly to the second reset line 24 at time intervals $t_1$. The time intervals $t_0$ and $t_1$ are related to the number of logic levels of any one of the logical functional logic units 10 and 12 respectively of FIG. 1. For example, each logic circuit of a unit 10 and 12 requires a finite time to change from the "low" to the "high" state in response to the applied input signals. Also a finite delay time is required for signal to propagate from one logic level to the next logic level. Note, however, that the various signals propagate through any given network in asynchronous fashion. The time interval $t_0$ therefore is made at least equal to the longest time required for an information signal to propagate from the input to the output of any one of the logic units 10. Similarly, the time interval $t_1$ between successive second reset pulses 43 is related to the longest time interval required for an information signal to propagate from the input to the output of any one of the logic units 12. The time intervals $t_0$ and $t_1$ may be of the same or different durations with respect to each other. The second reset pulses 43 are interlaced with the first reset pulses 42. Each second reset pulse 43 is applied at a time $t_2$ after the termination of the preceding first reset pulse 42. A time intervals $t_3$ is provided between the termination of each second reset pulse 43 and the initiation of the next first reset pulse 42. The time intervals $t_2$ and $t_3$ may be unequal, as shown, or equal, with each first reset pulses 42 appearing midway between a different pair of second reset pulses 43, and each second reset pulse 43 occurring midway between a different pair of first reset pulses 42.

In the operation of the network of FIG. 1, a first reset pulse 42 is applied to the logic units 10. After the first units 10 are reset to the "low" state, input signals appearing at their input sides, from the logic units 12 or from external sources, are operated upon during the time interval $t_D$. These input signals may be in the form of D.C. levels which are present during the first reset operation with the amplitude of the reset pulse 42 suitably adjusted to override these unit 12 input signals.

At the end of time interval $t_2$ (a time interval less than $t_0$), the second logic units 12 are reset to their "low" states by a second reset pulse 43. The logic units 12 then are ready to operate on signals received from the logic units 10 or from external sources. The signals from the units 10 are maintained for an additional time interval $t_3$ sufficient to transfer signals from the units 10 to the units 12. At the end of time interval $t_0$, a second reset pulse 42 is applied to the logic units 10 to change them to their "low" states preparatory to receiving new input signals from the logic units 12. During the time interval $t_1$, the units 12 process their received signals and transmit the result signals to the units 10. A second reset pulse 43 then is applied to the units 12.

The operation continues in this fashion with the information signals successively being transferred between units 10 and 12 until after a fixed number of reset cycles, all the desired output signals are provided at the network outputs.

Figure 6:
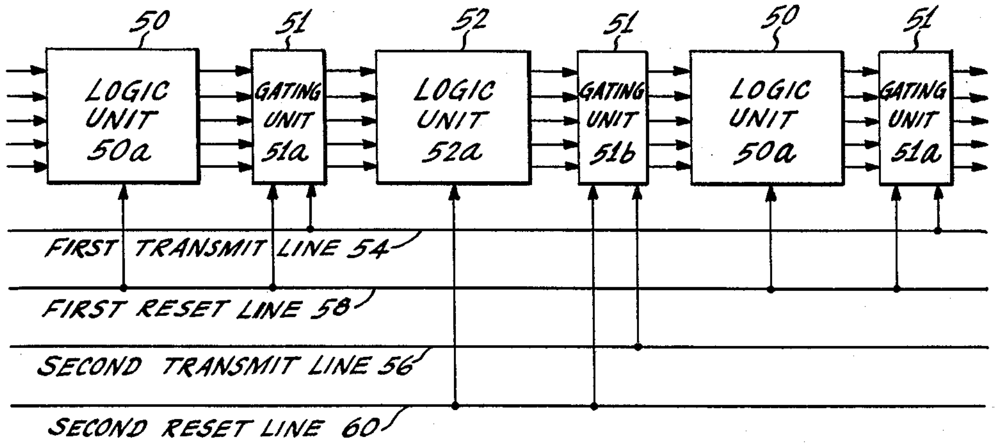
FIG. 6 is a block diagram of another embodiment of a logical network according to the invention.

In the embodiment of the invention according to FIG. 6 successive logic units 50, 52 are coupled to each other by gating units 51$a$ and successive logic units 52, 50 are coupled to each other by gating units 51$b$. Each of the gating units 51$a$ and 51$b$ may include a plurality of "and" gate circuits. A separate "and" gate of the gating units is used to couple each different output line of a logic unit 50 or 52 to an input line of the next succeeding logic circuit 52 or 50. Each of the "and" gate circuits may be a two-terminal, negative resistance diode circuit, such as for example the gate G8 of FIG. 3. A first of the inputs of each of the "and" gates of the gating units 51$a$ is connected to a first transmit line 54. A second input of each of these gates is connected to a different output line of a connected logic unit 50$a$. A first of the inputs of each of the "and" gates of the gating units 51$b$ is connected to a second transmit line 56. A first reset line 58 is coupled to all the gating circuits of the logic units 50a, and to each "and" gate of the gating units 51a. A second reset line 60 is coupled to all the gating circuits of the logic units 52b and to each "and" gate circuit of the gating units 51b.

Figure 7:
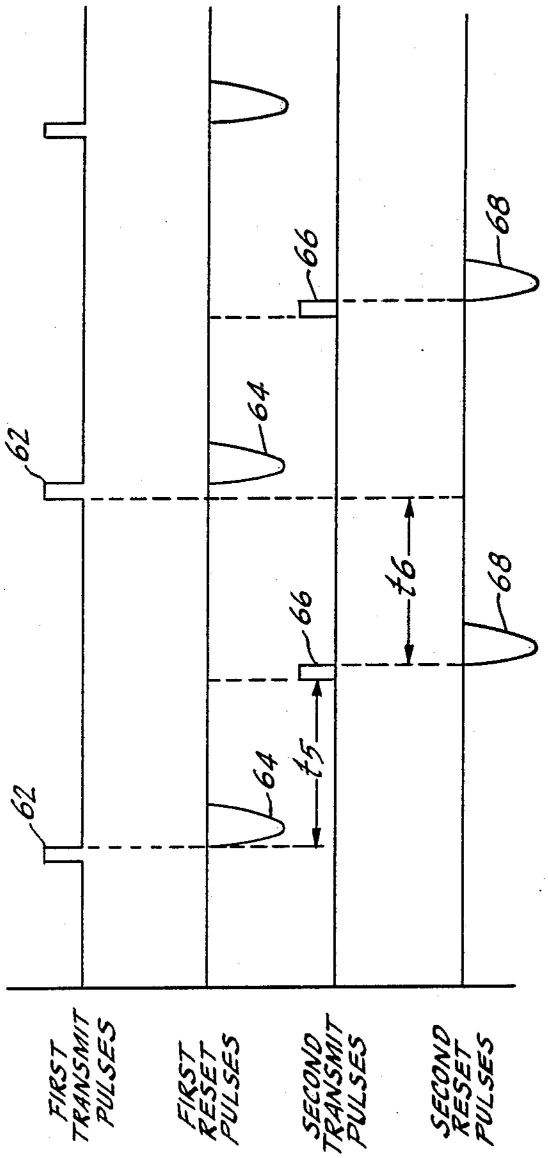
FIG. 7 is a graph of waveforms, all in the same time sequence, and useful in explaining the operation of the logical network of FIG. 6.

A timing diagram for the network of FIG. 6 shown in FIG. 7. Assume the logic units 52a and the gating units 51b are reset and the logic units 50a have propagated signals to the gating units 51a. At this time a transmit pulse 62 of the uppermost line of FIG. 7 is applied to the gating units 51a. The positive transmit pulse 64 changes each of the "and" circuits of a gating unit 51a which are enabled by a logic unit 50a to its "high" or set state. The non-enabled circuits of the gating unit 51a remain in their "low" or reset states. The gating unit 51a then transmits signals corresponding to those appearing at the output of the logic unit 50a to the logic unit 52a which is then in the reset condition. Next a reset pulse 64, shown in FIG. 7 in the second line from the top, is applied to the logic units 50a and the gating units 51b placing them in their reset condition.

After a time interval $t_5$ required for the input signals to propagate through the logic units 52a to the gating units 51b, a positive transmit pulse 66, shown in FIG. 7 in the second line from the bottom, is applied to the gating units 51a. These gating units then transmit signals to the logic units 50a which then are in their reset condition.

Following the second transmit pulse 66, a reset pulse 68 is applied to the logic units 52a and the gating units 51b placing these units in their reset conditions. The cycle is then repeated with a new transmit pulse 62 being applied to the gating units 51a after a time interval $t_6$ required for the information signals to propagate through the logic units 50a to the gating units 51a.

The time intervals $t_5$ and $t_6$ may be equal or unequal depending upon whether the logic units have the same or different numbers of logic levels. In any event the time interval $t_5$ is at least equal to the longest propagation time of any one of the logic units 52a, and the time interval $t_6$ is at least equal to the longest propagation time of any of the logic units 50a. Note that the negative reset pulse can be generated at any time during the time interval $t_5$ and the negative reset pulse 68 can be generated at any time during the time interval $t_6$.

What is claimed is:

1. A logical network comprising first and second interlaced groups of gating circuits, said circuits each including a negative resistance element, said groups each having inputs and outputs and being arranged to perform logical operations upon signals received at said inputs and to provide signals at said outputs, said output signals being provided after a maximum delay time interval required for operating upon input signals received at said inputs, a common direct current supply connected to all said circuits and arranged with said circuit parameters to provide bistable operation of each said circuit, a first reset means coupled to all said circuits of said first group for resetting all said first group circuits to an initial one of said states during the said delay time interval required by said second groups to operate upon their said input signals, and a second reset means coupled to all said circuits of said second group for resetting said second group circuits to an initial one of said states during the said delay time interval required by said first signals to operate upon their said input signals.

2. A logical network comprising a plurality of first groups of logic units, a plurality of second groups of logic units said groups each having inputs and outputs and being arranged to perform logical operations upon signals received at said inputs and to provide signals at said outputs and a maximum delay time interval being required for signals received at said inputs of any one of said groups to propagate to said output of that one group, means connecting said first and second groups in ordered sequence with successive second group units being coupled by a separate first group unit and successive first group units being coupled by a separate second group unit, said units each comprising one or more gating circuits including a negative resistance diode, said gating circuits each having two stable operating states, first reset means coupled to all the said gating circuits of said first units for resetting all said first group units to an initial one of said states during the said delay time interval required by said second group units to propagate their said input signals, and a second reset means coupled to all the said gating circuits of said second units for resetting said second group units to an initial one of said states during the said delay time interval required by said first groups to propagate their said input signals.

3. A logical network comprising first and second interlaced gating circuits said first and second gating circuits each having inputs and outputs and being arranged to perform logical operations upon signals received at said inputs and to provide signals at said outputs and a maximum delay time interval being required for signals received at the said inputs of said circuits to propagate to said outputs of said circuits, said circuits each including a negative resistance element, a common direct current supply connected to all said circuits and arranged with said circuit parameters to provide bistable operation of each said circuit, a first reset means coupled to all said first circuits for resetting said first gating circuits to an initial operating state during the said delay time interval required by said second circuits to propagate said input signals, and a second reset means coupled to all said second circuits for resetting said second circuits to an initial operating state during the said delay time interval required by said first circuits to propagate said input signals.

4. In a logical network comprising a group of gating circuits each of said gating circuits having a plurality of inputs and an output and being coupled to each other in an ordered sequence, said group of gating circuits requiring a maximum delay time interval for propagating signals received at said inputs through said sequence of circuits, said circuits each including a negative resistance element, a common direct current supply connected to all said circuits and arranged with said circuit parameters to provide bistable operation of each said circuit, a reset means coupled to all said circuits of said group for resetting each said first group said reset means being arranged to apply a reset signal to said circuits after said maximum delay time interval required for said circuits to propagate said input signals.

5. A logical network comprising a plurality of first groups of logic units, a plurality of second groups of logic units said groups each having inputs and outputs and being arranged to perform logical operations upon signals received at said inputs and to provide signals at said outputs and a maximum delay time interval being required for said inputs received at any one of said groups to propagate to said one group outputs, means connecting said first and second groups in ordered sequence with successive second group units being coupled by a separate first group unit, and successive first group units being coupled by a separate second group unit, said units each comprising one or more gating circuits including a negative resistance diode, said gating circuits each having two stable operating states, means for establishing a threshold operating point for each said gating circuit, and separate reset means coupled to said first and second units, said separate reset means being alternately operable and means for operating said first units reset means during the said delay time interval required by said second units to propagate said input signals, and said second units reset means being operated during the said delay time interval required by said first units to propagate said input signals.

6. A logical network comprising groups of logical gating circuits, each said gating circuit arranged to have two stable operating states and each said circuit changing from an initial to the other of said states only upon receipt of a given set of one or more input signals, said circuits each producing different output signals corresponding to the one and the other of said states, and a finite time being required for any of said groups of circuits to propagate input signals, means for applying input signals to certain of said groups of circuits, means for changing all said circuits of the remaining groups of said circuits to said other state while said certain groups are propagating said input signals, means for applying the output signals of said certain groups as other input signals to said remaining groups of circuits, and means for changing all said circuits of said certain groups to said other state while said remaining groups are propagating said other input signals.

References Cited in the file of this patent

UNITED STATES PATENTS

| | | |
|---|---|---|
| 2,841,705 | Moerman | July 1, 1958 |
| 2,873,385 | Ostendorf | Feb. 10, 1959 |
| 2,933,620 | Huang | Apr. 19, 1960 |
| 2,944,164 | Odell et al. | July 5, 1960 |
| 2,975,377 | Price | Mar. 14, 1961 |

OTHER REFERENCES

Arithmetic Operations In Digital Computers, by R. K. Richards, D. Van Nostrand, 1955, page 145.

UNITED STATES PATENT OFFICE
CERTIFICATE OF CORRECTION

Patent No. 3,119,935 January 28, 1964

Anatol G. Samusenko

It is hereby certified that error appears in the above numbered patent requiring correction and that the said Letters Patent should read as corrected below.

Column 6, line 36, for "$t_D$" read -- $t_O$ --.

Signed and sealed this 30th day of June 1964.

(SEAL)
Attest:

ERNEST W. SWIDER
Attesting Officer

EDWARD J. BRENNER
Commissioner of Patents